United States Patent [19]

Pasztor, Jr.

[11] Patent Number: 4,465,601
[45] Date of Patent: Aug. 14, 1984

[54] COMPOSITION AND METHOD FOR SERVICING WELLBORES

[75] Inventor: Andrew J. Pasztor, Jr., Midland, Mich.

[73] Assignee: The Dow Chemical Company, Midland, Mich.

[21] Appl. No.: 338,786

[22] Filed: Jan. 11, 1982

[51] Int. Cl.³ .............................................. E21B 43/00
[52] U.S. Cl. ............................ 252/8.55 R; 166/244 R
[58] Field of Search ............ 252/8.5 A, 8.5 B, 8.55 R, 252/363.5; 166/244 R

[56] References Cited

U.S. PATENT DOCUMENTS

| | | | |
|---|---|---|---|
| 4,292,183 | 9/1981 | Sanders | 252/8.55 |
| 4,304,677 | 12/1981 | Stauffer et al. | 252/8.55 |
| 4,336,146 | 6/1982 | Majewicz et al. | 252/8.55 |
| 4,392,964 | 7/1983 | House et al. | 252/8.55 X |

OTHER PUBLICATIONS

Plonka, Article in *World Oil*, Apr. 1972, pp. 88 and 89.
CA 74:35230e (1971).
CA 64:2794d (1966).
*Ind. Eng. Chem. Fundam.*, 13, (3), pp. 238–241, (1974), Jaques et al.
CA 83:153,353 (1975).
CA 83:198,484 (1975).
CA 75:122,778 (1971).
*Collect. Czech. Chem. Commun.*, 34, (11), pp. 3428–3435, (1969), Broul M. et al.
*A.I.Ch.E. Journal*, 18, (1), pp. 111–116, (1972), Meranda D. et al.
*Ind. Eng. Chem., Process Des. Dev.*, 15, (2), pp. 236–239, Jaques et al.
*Oil & Gas Journal*, (Nov. 9, 1981), pp. 254–275, Adams N.
*Solubilities, Inorganic and Metal-Organic Compounds*, vol. I, 4th Ed., pp. 503–505, (1958), Linke W.

Primary Examiner—Herbert B. Guynn
Attorney, Agent, or Firm—Charles J. Enright

[57] ABSTRACT

A method is disclosed for servicing a wellbore comprising introducing into the wellbore a substantially solids-free fluid comprising an admixture of water, calcium bromide and methanol and wherein the admixture has a density of at least about 15 lb/gal (1.80 kg/l) and a crystallization point of no more than about 20° C. The composition is also claimed.

10 Claims, 1 Drawing Figure

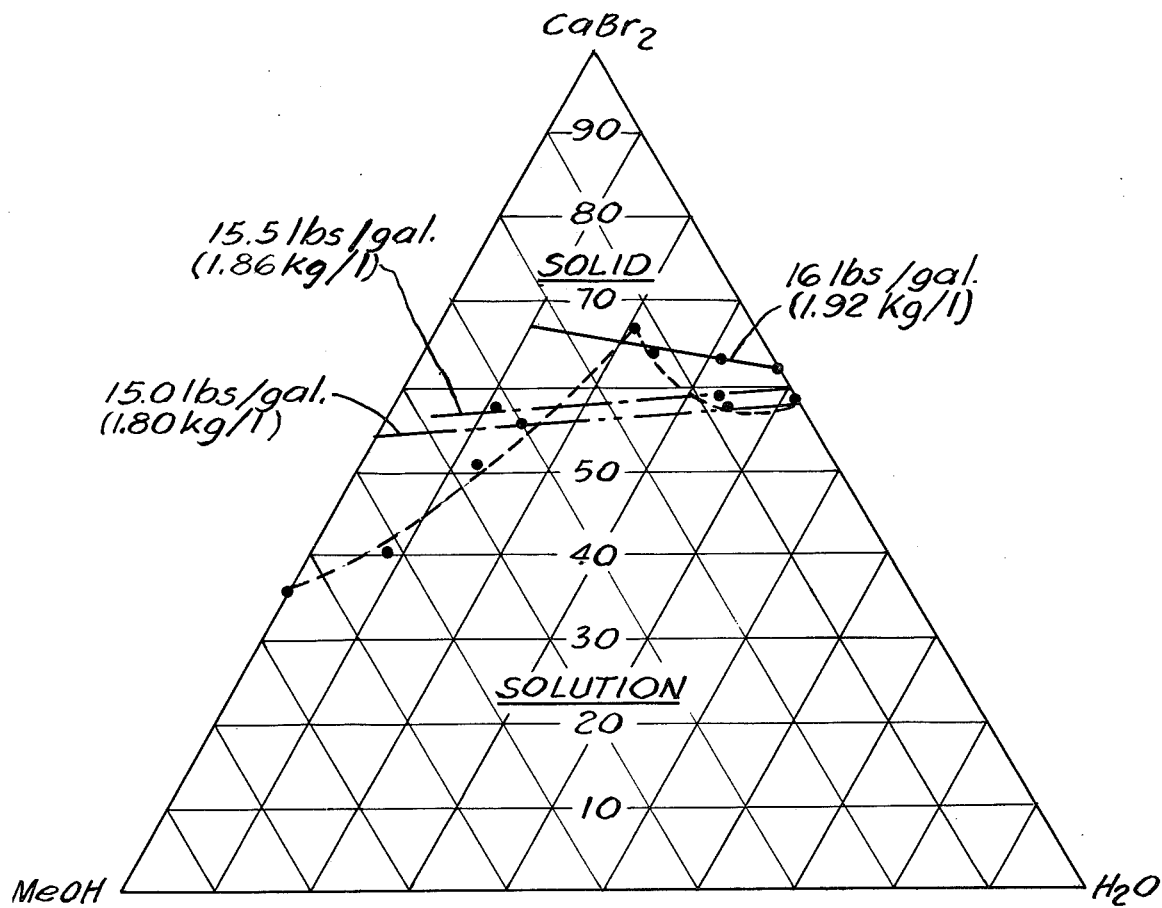

COMPOSITION AND METHOD FOR SERVICING WELLBORES

BACKGROUND OF THE INVENTION

This invention relates to a solids-free solution for introduction into wellbores and a method fof use therefor.

Subterranean formations may contain valuable mineral deposits such as hydrocarbon oils and gases, sulfur and other valuable natural resources. Contact may be made with these formations by drilling a wellbore from the surface to the subterranean formation. During the course of this drilling operation a fluid is introduced into the wellbore to lubricate and cool the drilling bit, to carry away material removed from subterranean formations by the drilling process, and to seal the walls of the borehole against loss of the fluid or invasion of the borehole by fluids in subterranean formations. Such a fluid or drilling mud is described, for example, in U.S. Pat. No. 2,073,413 which is herein incorporated by reference.

These drilling muds achieve the high density which is necessary to avoid intrusion of high pressure subterranean fluids into the borehole by weighting the mud with solid materials such as clays or barytes. High densities in the order of magnitude of 18–20 lb/gal are achievable with such drilling muds.

However, at certain times during the well drilling and completion process, it is desirable to have solids-free solutions contacting the subterranean formations in the borehole. For example, see the article by J. L. Kennedy, *The Oil and Gas Journal*, (Aug. 2, 1971) pp. 62–64, which is hereby incorporated by reference. Many procedures require a solids-free fluid. For example, packing and completion procedures can be injured by solids suspended in the fluid within the wellbore. See *Drilling and Production Practice*, C. M. Hudgins et al. (American Petroleum Institute) 1961; Hudgins et al., *The Oil and Gas Journal*, (July 24, 1961) pp. 91–96; and J. H. Plonka, *World Oil* (April, 1972) pp. 88–89; Neal Adams, *The Oil & Gas Journal* (Nov. 9, 1981), pp. 254–275. These articles, which are hereby incorporated by reference, describe the use of high density, solids-free brines as fluids. Sodium chloride can be used to make brines from 8.33 to 9.8 lb/gas. Calcium chloride can be used to make brines from 8.3 to 11.5 lb/gal. Calcium chloride/zinc chloride brines can be used to make brines from 11.5 to 14.0 lb/gal. The Hudgins articles describe zinc-containing fluids with densities greater than 14.0 lb/gal as being too corrosive for practical use. The Plonka article describes a solids-free calcium bromide/calcium chloride solution which can achieve a density of 15.0 lb/gal.

U.S. Pat. No. 4,292,183 describes a zinc bromide/calcium bromide solids-free solution having a density lying in the range from about 14.5 up to about 18.0 lb/gal. The Adams article describes a $CaCl_2/CaBr_2/ZnBr_2$ brine system with densities up to 19.2 lb/gal, as well as characteristics of the various fluids and methods of use.

It is sometimes desirable to have a solidsfree solution which has a density of greater than 15.0 lb/gal. Until this invention, this required the use of a zinc-containing fluid.

A desirable well-servicing fluid needs to have several characteristics concurrently. The density of the fluid should be such that the hydrostatic head formed by the column of fluid in the wellbore properly balances the fluid pressure of the subterranean formation. Appropriate balance may at times be slightly below the pressure of the subterranean formation, is often greater than the pressure of the subterranean formation, but most often is set to exactly match the hydraulic pressure of the fluid in the subterranean formation.

Fluids used during workover and completion range from low-density gases, such as nitrogen, to high-density muds and packer fluids. The applications and requirements for each fluid are different.

Fluids used during the reworking of a well after its initial completion are termed workover fluids. These fluids may be gases (such as nitrogen or natural gas), brine waters, or muds. The functions performed by the workover fluid include well killing, cleaning out a well by removing sand, rock, or metal cuttings, and other foreign objects, drilling into a new productive interval, or plugging back to complete a shallower interval.

Completion fluids are used during the operations that establish final communications between the productive formation and the well bore. The fluids may be a commericial workover fluid, nitrogen, or a clean, low-solids brine water and may be used for a short period of time such as well perforating or for extended periods such as in gravel packing. The primary requirement placed on the fluid is that it does not damage nor block the producing formation.

Packer fluids are placed in the annulus between the production tubing and casing. The most common requirements for packer fluids are to maintain pressure control, be nontoxic and noncorrosive, remain pumpable, and minimize formation damage.

The well-servicing fluid should be solidsfree. That means substantially free from suspended solids of greater than about 5 microns in diameter. It also means that the solution should have a crystallization point lower than the use temperature. Generally, the crystallization point is the minimum temperature at which the soluble solids are dissolved to form a solidsfree solution.

Corrosivity is also an important factor. The corrosivity of the brine solution should be such that no significant corrosion of metal piping or drilling implements occurs. This generally requires an uninhibited corrosion rate of less than 0.005 inch/year. This is particularly true when the fluid is used to shut in a well. The fluid may be in contact with the downhole piping for long periods of time. It is also important to minimize harm to the environment.

When one requires a solution with a density of greater than 15.0 lb/gal to balance the formation pressure, each of the previous recited fluids has shortcomings. All of the brines except the zinc-containing brines will not form a solids-free solution at greater than 15.0 lb/gal with a crystallization point of less than 20° C. The densities and solubilities of the solid salts will not permit it. While the zinc-containing brines may form solids-free solutions at greater than 15.0 lb/gal, these solutions are generally more corrosive and may harm the environment. It is therefore an object of this invention to provide a solids-free well-servicing fluid with a density of greater than 15.0 lb/gal and a crystallization point of less than 20° C. that does not require the use of zinc salts.

SUMMARY OF THE INVENTION

This and other objects of the invention are achieved in a method for servicing a wellbore comprising introducing into the wellbore a fluid comprising an admixture of water, calcium bromide and methanol. The density of this solution is at least about 15.0 lb/gal (1.80 kg/l) and has a crystallization point of no more than about 20° C.

The composition consisting essentially of an admixture of water, calcium bromide and methanol wherein the admixture has a density of at least about 15.0 lb/gal (1.80 kg/l) and a crystallization point of no more than about 20° C. is also considered novel.

A feature of this invention is that it incorporates commercially available and relatively environmentally safe materials to achieve densities which have heretofore been unachievable with such low environmental risk and corrosivity.

BRIEF DESCRIPTION OF THE DRAWING

The drawing represents a phase diagram for the methanol/CaBr$_2$/water system.

DETAILED DESCRIPTION OF THE INVENTION

The high density, well-servicing fluid of the present invention may consist essentially of a substantially solids-free admixture of water, calcium bromide and methanol wherein the admixture has a density of at least about 15.0 lb/gal (1.80 kg/l) and a crystallization point of no more than about 20° C.

In addition to calcium bromide and methanol, certain hydrates and methanates may be present in the admixture. Also, other water-soluble materials may be used in the well-servicing fluid in an amount less than that which would adversely affect the utility of the solution. Such materials include, for example: organic corrosion inhibitors such as triethanolamine, propargyl alcohol, pyridine and its derivatives, and other organic corrosion inhibitors known to those in the art; viscosity adjusting reagents such as, for example, hydroxymethylcellulose and others known to those in the art; pH controlling materials such as sodium hydroxide, calcium hydroxide and the like. In some applications it may be desirable to blend the fluid of the invention with other inorganic salt solutions to adjust the final density of the well-servicing fluid. Such solutions include, for example, solutions of the inorganic salts, calcium chloride, sodium chloride, mixtures thereof and the like.

Such a well-servicing fluid would preferably not include metallic ions not commonly found in sea water at a concentration greater than 1 ppm. Metallic ions commonly found in sea water in greater than 1 ppm concentration include sodium, magnesium, calcium, potassium, and strontium. Metallic ions which would be absent from the composition of the invention include zinc, lithium, and chromium which would only be present in small quantities as impurities or as a treating agent such as a zinc oxide corrosion inhibitor. In any case, these materials may be present at less than 1 percent, preferably at less than 0.5 percent and most preferably at less than 0.1 percent concentrations by weight based on the total solution.

The presence of any substantial amount of solids in the fluid of the invention may lead to damage to the subterranean formation. Suspended solids may effectively block production from the formation. Preferably the fluid is free of solids of a particle size larger than 5 microns. Most preferably the solution is completely solids-free. Solids present may include general impurities found in the materials used to make the fluid, dust and dirt adhering to the equipment used or solids precipitated by cooling of the solution or other chemical process such as pH adjustment.

The components used to make the fluid of the invention are generally commercially available materials. The calcium bromide used is of general commercial quality and may be a material commonly referred to as calcium bromide spike which is an 80 percent calcium bromide/20 percent water solid. The calcium bromide may also be generated in aqueous medium, for example, by reacting hydrogen bromide with calcium hydroxide, for example, in the method described in U.S. Pat. No. 4,234,556 which is herein incorporated by reference.

Any available water may be used to make the fluid as long as it does not contain materials deleterious to the properties. Sea water may be used though fresh water is preferred. The components of the admixture may be mixed in any order but generally it is more convenient to add the solids to a mixture of the two liquid components. The percentage ranges of the components in the fluid of the invention generally range from 55 to 70 percent calcium bromide, 15 to 35 percent water, and 5 to 30 percent methanol. This can be seen in the drawing as the area between the two curves, to wit, between the isodensity line of 15.0 lb/gal and the curve showing the compositions with a 20° C. crystallization point.

Referring now to the drawing, we see a standard triangular composition diagram for a 3-component system. At the uppermost corner which is labeled CaBr$_2$ for calcium bromide, the point at the apex of the triangle represents a composition of 100 percent calcium bromide and each line which is parallel to the opposite side of the triangle represents a 10 percent increment in the percentage by weight of calcium bromide on the phase diagram. Similarly at the two lower corners of the triangle, methanol designated MeOH and water designated H$_2$O label the apexes which stand for the 100 percent methanol composition and the 100 percent water composition, respectively. The lines within the triangle running parallel to the opposite sides from each of these two apexes also represent 10 percent increments of composition.

Four curves are presented on this compositional chart for discussion. Three of the curves approximate straight lines and represent isodensity curves. That is each of the points on the curve represent the composition which has a given density. The three curves are labeled 15.0, 15.5 and 16.0 lb/gal. The points on these curves may represent compositions which are solids or liquids of mixtures thereof. The drawing was made as accurately as the data permits. However, differences of several percent may not be significant and are considered to be within experimental error.

The fourth curve represents an isocrystallization point line. That is, each point on the line represents a composition which has a crystallization point of about 20° C. or 68° F. For purposes of discussion in this disclosure, the crystallization point of the solution is determined by placing 2 to 5 ml of the solution in a test tube and then cooling it in a dry ice/methylene chloride bath until solids appear. The mixture with the suspended solids is then heated slowly with stirring until the last crystal dissolves. The temperature at which the last crystal dissolves is the crystallization point.

Other workers in this field have used an experimental method similar to this one wherein the crystallization point is taken to be the temperature at which the crystal first appears upon cooling. This was not done with this system because of the tendency of this system and similar systems to supercool. The result of this is that the temperature at which the first crystal appears may be several degrees lower than the temperature at which the last crystal disappears. Therefore, for purposes of the disclosure and the claims of this application, the temperature at which the last crystal disappears is taken to be the crystallization point.

Referring to the drawing, the isocrystallization point line extends from a composition of approximately 35 percent calcium bromide/65 percent methanol to a point just on the opposite side of the 16 lb isodensity line with a composition of approximately 67 percent calcium bromide, 13 percent methanol and 20 percent water. This approximates the maximum density which can be achieved with this 3-component mixture while still retaining a crystallization point of 20° C. The isocrystallization point curve continues from this maximum to a point which represents approximately 58.8 percent calcium bromide and 41.2 percent water.

The portion of this compositional chart which is bounded by the isocrystallization point curve at 20° C. lying in the direction of the apex labeled calcium bromide, represents that portion of the compositions of these three components which are not solids-free at 20° C. and lower temperatures. That portion of the compositional chart which lies between the isocrystallization point curve at 20° C. and the side opposite the calcium bromide apex represents the compositions of these three components which will be solids-free at 20° C. or higher. The fluid composition of the invention is represented by points in that area of the phase diagram lying on or within the area enclosed by the 15.0 lb/gal isodensity line and the 20° C. isocrystallization point line.

The density of the fluid of the invention is generally expressed in lb/gal or kg/l. One lb/gal equals 0.1198 kg/l and 1 kg/l equals 8.345 lb/gal. The density of water is approximately 1 kg/l or 8.34 lb/gal. Density of the solutions may be determined in any of the ways known to those skilled in the art, for example, by using a pycnometer or a hydrometer. Generally the fluid will have a density of at least about 15.0 lb/gal. This is represented by points on the composition diagram of the figure which lie between the 15.0 lb/gal isodensity line and the pure calcium bromide apex of the triangle. Preferably, the density will be greater than 15.0 lb/gal or, for example, at least 15.1 lb/gal. Most preferably the fluid of the invention will have a density of at least 15.5 lb/gal and may have a density of 16.0 lb/gal or greater. All of these densities given require that the fluid of the invention be solids-free and have a crystallization point of 20° C. or less.

In addition to calcium bromide and methanol, hydrates and methanates of calcium bromide will be present in the admixture. While the exact nature of such materials is difficult to determine, and their presence is difficult to detect, it is apparent that whatever species is present, the admixture has the properties of density, crystallization point, corrosivity and environmental effects as herein above described.

Examples of well-servicing techniques where the fluid of the invention may be employed are taught, for example, in U.S. Pat. No. 2,894,584; 2,898,294 and 3,126,950. The teachings of these patents are specifically incorporated herein by reference.

The following examples further illustrate this invention, but should not be construed as limiting the scope.

EXAMPLE 1

108 Milliliters (ml) of $CH_3OH$ were added to 100 ml of commercially available fluid containing 53 percent $CaBr_2$ and 47 percent $H_2O$. To this was added 150 grams (g) of $CaBr_2$ spike in increments of 10 to 50 g ($CaBr_2$ spike is 80 percent $CaBr_2$ and 20 percent $H_2O$). After mixing on a shaker table the solution was filtered. This solution had a density of 13.19 ppg (1.58 kg/l). The solution was divided in half and to approximately 125 ml of solution were added 175 g of spike. Again, after shaking until all of the solids were dissolved, the solution was filtered. The density of the solution was 16.0 ppg (1.92 kg/l) and it had a crystallization point of 64.5° F. (18.1° C.).

EXAMPLE 2

To an 8-ounce jar were added 81 ml of methanol and 50 ml of 53 percent $CaBr_2$ and 47 percent $H_2O$. Additions of 25 or 50 g of $CaBr_2$ spike (80 percent $CaBr_2$ and 20 percent $H_2O$) were made 11 times so that the total weight of spike added was 325 g. The solution was then suction filtered. The density was found to be 16.0 ppg (1.92 kg/l). The crystallization point was determined by placing 2 to 5 ml of solution in a test tube and then cooling in a dry ice/methylene chloride bath until solids appeared. This was then heated slowly with stirring until the last crystal dissolved. The crystallization point of the solution was 62° F. (16.7° C).

An aqueous solution of $CaBr_2/H_2O/MeOH$ will have a lower crystallization point when compared to a $CaBr_2/H_2O$ fluid. The crystallization poit depression is due to the presence of MeOH in combination with the $CaBr_2$ and water in solution. At a density of 15.9 ppg (1.91 kg/l), the $CaBr_2/H_2O/MeOH$ solution has a crystallization point of 64° F. (17.8° C). This can be directly contrasted to a solution containing only $CaBr_2$ and water wherein a 15.9 ppg (1.91 kg/l) fluid would have a crystallization point of 81° F. (27.2° C.). The variation in crystallization point temperatures (CP) of solutions of $CaBr_2/H_2O/MeOH$ and $CaBr_2/H_2O$ is illustrated by Table I.

TABLE I

| Density | | $CaBr_2/H_2O$ vs $CaBr_2/H_2O/MeOH$ | | | | |
|---|---|---|---|---|---|---|
| | | $CaBr_2/H_2O$ | | $CaBr_2/H_2O/MeOH$ | | |
| g/cc | lb/gal | % $CaBr_2$ | CP °F. | % $CaBr_2$ | % MeOH | CP °F. |
| 1.905 | 15.9 | 61.5 | 81 | 64.6 | 12.8 | 64 |
| 1.955 | 16.3 | 64.0 | 90 | 65.8 | 12.3 | 70 |
| 1.865 | 15.5 | 60.0 | 74 | 63.3 | 13.3 | 55 |
| 1.815 | 15.1 | 58.5 | 68 | 62.0 | 13.9 | 60 |

$CaBr_2/H_2O$ data
Densities: International Critical Tables
CP: Seidell (Revised by Linke), Solubilities: Inorganic and Metal Organic Compounds; Van Nostrand Co., Inc., 1958.

Although the invention has been described in considerable detail, it must be understood that such detail is for the purpose of illustration only. That many variations and modifications can be made by one skilled in the art without departing from the spirit and scope of the invention.

What is claimed is:

1. A method of working over, completing or packing a wellbore including introducing into the wellbore a solids-free fluid comprising an admixture of water and sufficient calcium bromide and methanol to yield the admixture which has a density of at least about 15 lb/gal (1.80 kg/l) and a crystallization point no higher than about 20° C. and wherein zinc, lithium or chromium may be present in the admixture at less than one percent by weight based on the total admixture.

2. The method of claim 1 wherein the admixture has a density of at least about 15.5 lb/gal.

3. The method of claim 2 wherein the admixture has a density of at least about 16.0 lb/gal.

4. The method of claim 1 wherein the admixture comprises from about 55 to about 70 weight percent calcium bromide; from about 15 to about 35 weight percent water; and from about 5 to about 30 weight percent methanol.

5. The method of claim 1 wherein the fluid composition is represented by points of the phase diagram of the drawing lying on or within an area enclosed by a 15 lb/gal isodensity line and a 20 ° C. isocrystallization point line.

6. A composition consisting essentially of an admixture of water, and sufficient calcium bromide and methanol to yield the admixture which has a density of at least about 15 lb/gal (1.80 kg/l) and a crystallization point no higher than about 20° C.

7. The composition of claim 6 wherein the admixture has a density of at least about 15.5 lb/gal.

8. The composition of claim 7 wherein the admixture has a density of at least about 16.0 lb/gal.

9. The composition of claim 6 wherein the admixture comprises from about 55 to about 70 weight percent calcium bromide; from about 15 to about 35 weight percent water; and from about 5 to about 30 weight percent methanol.

10. The composition of claim 6 wherein the fluid composition is represented by points of the phase diagram of the drawing lying on or within an area enclosed by a 15 lb/gal isodensity line and a 20° C. isocrystallization point line.

* * * * *